US006713131B2

(12) United States Patent
Blackwood et al.

(10) Patent No.: US 6,713,131 B2
(45) Date of Patent: Mar. 30, 2004

(54) METHODS OF COATING FABRICS WITH EMULSIONS OF ELASTOMERIC POLYMERS AND POLYURETHANE DISPERSIONS

(75) Inventors: William Raye Blackwood, Midland, MI (US); Shaow Burn Lin, Midland, MI (US); Anil Kumar Saxena, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/118,870

(22) Filed: Apr. 8, 2002

(65) Prior Publication Data

US 2003/0190429 A1 Oct. 9, 2003

(51) Int. Cl.$^7$ ................................................ B05D 3/00
(52) U.S. Cl. ........................................ 427/387; 427/412
(58) Field of Search ................................. 427/387, 412

(56) References Cited

U.S. PATENT DOCUMENTS

| 5,013,811 | A |   | 5/1991  | Ross ............................ 528/60   |
| 5,073,418 | A |   | 12/1991 | Thornton et al. ........... 428/34.9      |
| 5,110,666 | A |   | 5/1992  | Menzel et al. ............... 428/196     |
| 5,254,621 | A |   | 10/1993 | Inoue et al. ................. 524/837    |
| 5,486,210 | A |   | 1/1996  | Kerr et al. .................. 8/115.66   |
| 5,543,484 | A | * | 8/1996  | Chung et al. ............. 526/347.1      |
| 5,554,686 | A |   | 9/1996  | Frisch, Jr. et al. .......... 524/588     |
| 5,747,582 | A |   | 5/1998  | Schutze et al. .............. 524/591     |
| 5,840,800 | A | * | 11/1998 | Joffre et al. ................. 524/806   |
| 5,985,369 | A |   | 11/1999 | Kerkmann et al. .......... 427/380        |
| 5,998,540 | A |   | 12/1999 | Lipkin et al. ................ 524/591    |
| 6,037,279 | A |   | 3/2000  | Brookman et al. ............ 442/71       |
| 6,077,611 | A |   | 6/2000  | Griswold et al. ......... 428/423.3       |
| 6,169,043 | B1 |  | 1/2001  | Li ............................... 442/71 |
| 6,177,365 | B1 |  | 1/2001  | Li ............................... 442/71 |
| 6,177,366 | B1 |  | 1/2001  | Li ............................... 442/71 |
| 6,239,046 | B1 |  | 5/2001  | Veiga et al. .................. 442/76    |
| 6,425,600 | B1 |  | 7/2002  | Fujiki et al. ............. 280/728.1     |

FOREIGN PATENT DOCUMENTS

| JP | 10273587 A    | 10/1998 |
| WO | WO 00/78577 A1 | 12/2000 |
| WO | WO 00/78578 A1 | 12/2000 |

OTHER PUBLICATIONS

U.S. patent application Ser. No. 09/905,660, Lin et al., filed Jul. 13, 2001.

* cited by examiner

Primary Examiner—Erma Cameron
(74) Attorney, Agent, or Firm—Alan Zombeck

(57) ABSTRACT

A method for coating a substrate comprises the steps of:

(I) applying a layer on the substrate of a curable composition comprising:
(A) a water continuous emulsion comprising a curable elastomeric polymer having a viscosity of 0.5–1,000,000 KPa-s and a glass transition temperature up to 50° C.,
(B) an aqueous polyurethane dispersion, and optionally
(C) a cure agent
(II) exposing the layer to air for sufficient time to form a cured coating. Coated fabrics prepared accordingly are particularly useful in the construction of automobile protective airbags or other such inflatable coated textile devices.

26 Claims, No Drawings ial film. The most common polymeric materials currently being used to coat airbag fabrics are based on silicones, as described for example in U.S. Pat. No. 6,037,279. The silicone coating primarily provides a thermal barrier on the airbags to protect the fabric from the high temperature burst associated with ignition of the gas upon deployment. The silicone coating also provides some gas retention properties for the deployed airbag. One option to meet the increasing demand for gas retention is to increase the thickness of the silicone coating. However, newer designs for airbags, and in particular side impact airbags and inflatable curtains for side compartments, require airbags to have a more compact design. This results in a need for lower coating weights on the airbag fabrics. Furthermore, next generation side and inflatable curtain airbags have a need to retain pressured air/gas for sufficient time to provide rollover protection for greater than 5 seconds. Current silicone based coatings are too permeable to air/gas, especially at lower coat weights, to provide sufficient gas retention in deployed side and curtain airbags. Thus, there is a need for a fabric coating composition, and methods of application, to provide coated fabrics with sufficient air/gas retention for use in the construction of airbags, and in particular side and curtain airbags.

METHODS OF COATING FABRICS WITH EMULSIONS OF ELASTOMERIC POLYMERS AND POLYURETHANE DISPERSIONS

FIELD OF THE INVENTION

The present invention relates to methods of coating substrates with a composition comprising a water continuous emulsion of a curable elastomeric polymer, and aqueous polyurethane dispersion, and an optional cure agent. Coated fabrics prepared according to these methods are particularly useful in the construction of automobile protective airbags.

BACKGROUND OF THE INVENTION

The use of airbags in motor vehicles has grown exponentially in recent years. Their use has expanded beyond frontal airbags for protection for the driver and passenger. Side airbags and inflatable curtains are now included in side compartments of vehicles for enhanced protection from side collisions or rollovers. This expanded use has placed new demands on the physical properties attributed to the airbags. In particular, improved air retention performance of airbags are desired to ensure the airbag remains inflated and maintains its integrity for an extended period of time upon deployment.

Typically, airbags are made from synthetic fibers, such as a polyamide (nylon) or polyester and coated with a polymeric film. The most common polymeric materials currently being used to coat airbag fabrics are based on silicones, as described for example in U.S. Pat. No. 6,037,279. The silicone coating primarily provides a thermal barrier on the airbags to protect the fabric from the high temperature burst associated with ignition of the gas upon deployment. The silicone coating also provides some gas retention properties for the deployed airbag. One option to meet the increasing demand for gas retention is to increase the thickness of the silicone coating. However, newer designs for airbags, and in particular side impact airbags and inflatable curtains for side compartments, require airbags to have a more compact design. This results in a need for lower coating weights on the airbag fabrics. Furthermore, next generation side and inflatable curtain airbags have a need to retain pressured air/gas for sufficient time to provide rollover protection for greater than 5 seconds. Current silicone based coatings are too permeable to air/gas, especially at lower coat weights, to provide sufficient gas retention in deployed side and curtain airbags. Thus, there is a need for a fabric coating composition, and methods of application, to provide coated fabrics with sufficient air/gas retention for use in the construction of airbags, and in particular side and curtain airbags.

The current airbag fabrics also requires the removal of unwanted sizing, protective oil after woven steps before application of the coating material. This is done by chemical scouring, washing, then drying of the scoured airbag fabrics. These steps are non-value added, labor-intensive, and costly. Also, residual moisture on the fabric surface can cause imperfections on the coated surface when a non-aqueous coating is applied. Thus, there exsits an additional need to develop a coating composition that can be applied directly over wet fabrics, provides good adhesion to the fabric, and dries to a uniform coating without imprefections.

One technique that has been reported to decrease coating weights and maintain low permeability performance of coated fabrics for use in airbags has been to use a two layered coating system, as disclosed for example in U.S. Pat. No. 6,177,365. The U.S. Pat. No. 6,177,365 patent teaches the application of a first layer to the fabric of a non-silicone material followed by the application of a silicone containing topcoat. U.S. Pat. No. 6,177,366 also teaches a two layer coating system for airbag fabrics where the first layer contains up to 30% of a silicone resin and the topcoat contains a silicone material. U.S. Pat. No. 6,239,046 teaches an airbags having a first coating layer of adhesive polyurethane and a second coating layer of an elastomeric polysiloxane.

Alternative coating compositions have been disclosed based on polyurethanes, such as in U.S. Pat. No. 5,110,666, or on polyurethane/polyacrylate dispersions as found in U.S. Pat. No. 6,169,043.

While the coating systems cited above represents advancements in airbag technology, a need still exists to provide improved compositions and techniques for coating fabrics for use in airbags. In particular, coating compositions that provide similar or improved permeability at lower coating weights and improved aging stability are desired. Furthermore, there is a need to provide coatings that eliminate the need for pre-treatment of the fabrics.

SUMMARY OF THE INVENTION

The present invention is directed to a method for coating a substrate comprising the steps of:
(I) applying a layer on the substrate of a curable composition comprising:
  (A) a water continuous emulsion comprising a curable elastomeric polymer having a viscosity of 0.5–1,000,000 KPa-s and a glass transition temperature up to 50° C.,
  (B) an aqueous polyurethane dispersion, and optionally
  (C) a cure agent
(II) exposing the layer to air for sufficient time to form a cured coating. The present invention further provides a method for forming a cured second coating of a composition comprising a polyorganosiloxane-based elastomeric material upon the first cured coating.

The present invention is also directed to the coated substrates prepared by the methods described herein.

DETAILED DESCRIPTION OF THE INVENTION

Step (I) of the method of the present invention is applying a layer on a substrate of a curable composition comprising:
(A) a water continuous emulsion comprising a curable elastomeric polymer having a viscosity of 0.5–1,000,000 KPa-s and a glass transition temperature up to 50° C.,
(B) an aqueous polyurethane dispersion, and optionally
(C) a cure agent Component (A) is a water continuous emulsion comprising a curable elastomeric polymer having a viscosity of 0.5–1,000,000 KPa-s and a glass transition temperature up to 50° C. As used herein, "water-continuous emulsion" refers to an emulsion having water as the continuous phase of the emulsion. Water-continuous emulsions are characterized by their miscibility with water and/or their ability to be diluted by the further addition of water.

The elastomeric polymers that can be used as starting materials to prepare the water continuous emulsion suitable as component (A) in the present invention, are any polymers having a viscosity of 0.5–1,000,000 KPa-s and a glass transition temperature up to 50° C. One skilled in the art recognizes the term elastomeric to describe materials as having rubber-like properties or rubbery characteristics, that is, materials which can be extended to twice its own length at room temperature or having an elongation of 100% or higher at room temperature. When the term "polymer" is used herein, it should be understood to describe polymers that may be homopolymers, copolymers, terpolymers, and mixtures thereof.

For the purpose of this invention, the viscosity of the curable elastomeric polymer is defined as "zero-shear" viscosity at ambient temperature. This is commonly defined as the viscosity of a polymer when approaching zero-shear rate conditions and is regarded as a constant value for a given polymer. The "zero-shear" viscosity is an approximated constant viscosity value derived empirically or from experimentally measured viscosity values.

The curable elastomeric polymers suitable in the present invention can have a viscosity of 0.5 to 1,000,000 KPa-s, preferably the viscosity is 0.5 to 500,000 KPa-s, and most preferable is when the curable elastomeric polymer has a viscosity of 1.0 to 100,000 KPa-s. While the correlation of viscosity and molecular weight will vary depending on the specific type of polymer, generally the number average molecular weights (Mn) of the curable elastomeric polymers that can be typically used in the present invention range from 5,000 to 300,000 g/mole, preferably 5,000 to 200,000 g/mole, and most preferably range from 5,000 to 100,000 g/mole.

For purposes of this invention, the term "glass transition temperature" is the accepted meaning in the art, that is, the temperature at which a polymer changes from a brittle vitreous state to a plastic state. The glass transition temperature can be determined by conventional methods such as dynamic mechanical analyzer (DMA) and differential scanning calorimetry (DSC). The curable elastomeric polymers of the present invention should have a glass transition temperature of less than 50° C. Preferably, the curable elastomeric polymers of the present invention should have a glass transition temperature of less than 30° C., and more preferably, the curable elastomeric polymers should have a glass transition temperature of less than 0° C.

As used herein, "curable elastomeric polymer" refers to any elastomeric polymer that has been modified to have at least one curable functional group attached to the polymer. Generally, curable elastomeric polymers are polymers having reactive groups contained therein that are able to crosslink during the curing process to yield an elastomeric polymer. The curable elastomeric polymers can be characterized as elastomeric polymers to which at least one reactive group or functional group is attached such as an alkenyl, vinyl, allyl, hydroxyl, carboxyl, epoxy, vinyl ether, alkoxy, amine, amino, amido, silane, organosilane, or organosilyl group. The reactive-group or functional group may be attached at a terminal and/or pendant position on the polymer chain. The curable elastomeric polymer should maintain structural integrity during the emulsification process and subsequently in the emulsion state. Upon water-removal, for example as in a coating application, the reactive-group or functional group cures to form a cured elastomeric polymer. The curing may take place by merely drying off the water, or assisted by an external catalyst, heat, radiation, moisture, or in conjunction with an external curative.

The elastomeric polymers that can be used as starting materials to prepare the curable elastomeric polymers and subsequently emulsified to form water continuous emulsions suitable as component (A) of the present invention include, but are not limited to, the elastomeric polymers typically associated with the following general classes of elastomeric materials such as; natural rubber, polyolefins, poly(olefin-diene)s, polydienes, butyl rubber, nitrile rubber, chloroprene rubber, fluorocarbon elastomers, polysulfide rubbers, polyurethane and combinations thereof.

Illustrative examples of elastomeric polymers that can be functionalized to produce curable elastomeric polymers useful in the preparation of water continuous emulsions for the present invention include, but are not limited to: poly (olefins) and poly(olefins-dienes) copolymers, and their derivatives, that is, polymers and copolymers derived from olefinic monomers $C_2$ to $C_{12}$, dienes $C_4$ to $C_{12}$ such as, polyethylene, polypropylene, poly(butene-1), poly (propylethylene), poly(decylethylene), poly (dodecylethylene), poly(butylethylene), poly (ethylethylene), poly(ethyl-2-propylene), poly (isopropylethylene), poly(isobutylethylene), poly (isopentylethylene), poly(heptylethylene), poly(tert-butylethylene), poly(ethyele-co-propylene), poly(ethylene-propylene-diene) terpolymers (EPDM); polymers and copolymers of monoolefin, isomonoolefin and vinyl aromatic monomers, such as $C_2$ to $C_{12}$ monoolefins, $C_4$ to $C_{12}$ isomonoolefins, vinyl aromatic monomers including styrene, para-alkylstyrene, para-methylstyrene, (methods of preparing such polymers can be found in U.S. Pat. No. 5,162,445, and U.S. Pat. No. 5,543,484); poly(dienes) and derivatives; such as, polybutadiene, polyisoprene, poly (alkyl-butenylene) where alkyl can be a hydrocarbon group containing 1 to 12 carbon atoms, poly(phenyl-butenylene), polypentenylene, natural rubber (a form of polyisoprene), butyl rubber (copolymer of isobutylene and isoprene), illustrative commercial examples of polyisobutylenes suitable in the present invention are OPPANOL B products from BASF (BASF, Ludwigshafen, Germany), VISTANEX™ products from Exxon (Houston, Tex.), and EPION products from Kaneka (Kanegafuchi Chemical Industry Co. Ltd. Tokyo, Japan and Kaneka America Corp, New York, N.Y.); halogenated olefin polymers; such as from the bromination of copolymers of isomonoolefin with para-methylstyrene to introduce benzylic halogen (as described in U.S. Pat. No. 5,162,445), halogenated polybutadienes, halogenated polyisobutylene such as EXXPRO™ products from Exxon-Mobil (Houston, Tex.), poly(2-chloro-1,3-butadiene), poly-chloroprene (85% trans), poly(1-chloro-1-butenylene) (NEOPRENE™), chlorosulfonated polyethylene; polyurethanes and polyureas; such as elastomeric polyurethanes and polyureas prepared from a wide variety of monomeric diisocyanates (aliphatic diisocyanates such as hexamethylene diisocyanate, cyclohexyldiisocyanate, ($H_{12}$MDI) or hydrogenated MDI (HMDI), isophorone diisocyanate (IPDI)); aromatic diisocyanates such as toluene diisocyanate (TDI), bis(methylene-p-phenyl diisocyanate (MDI), chain-extending diols, diamines, and oligomeric diols selected from polyether, polyester, polycarbonate, and polycaprolatom; poly(alkyl acrylates), and poly (alkyl methacryaltes), that is polymers and copolymers derived from alkyl acrylates and alkyl methacrylates such as poly(methyl acrylate), poly(ethyl acrylate), poly(butyl acrylate), poly(isobutyl acrylate), poly(2-ethylbutyl acrylate), poly(2-ethylhexyl acrylate), poly(n-octyl methacrylate), poly(dodecyl acrylate); copolymers and terpolymers of dienes, alkenes, styrenes, acrylonitriles, such as poly(butadiene-co-styrene), poly(butadiene-co-acrylonitrile), poly(butadiene-co-methyl metharyalte); poly(fluoroalkyl acrylates) that is polymers and copolymers derived from fluoro-containing acrylates and methacrylates such as polymer(fluoromethyl acrylate), poly(2,2,2-trifuoroethyl acryalte), poly(1H,1H-pentfluoropropyl acryate), poly(1H,1H,5H-octafluoropentyl acrylate); poly(vinyl ethers) and poly(vinyl thioethers) such as those polymers derived from butoxyethylene, sec-butoxyethylene, tert-butoxyethylene, alkyl vinyl ether, propoxyethylene, vinyl methyl ether (methoxyethylene), hexyloxyethylene, 2-ethylhexyloxy ethylene, butylthioethylene; poly(oxyalkylenes) such as poly(oxyethylene), poly(oxypropylene), poly(oxythylene-co-propylene); plasticizer compounded thermoplastics, that is thermoplastics having elastomeric behavior because of the addition of a plasticizers or other compatible additives, such as poly(vinyl chloride) compounded with dioctyl phthalate, tricresyl phophate, dibutyl sebacate, or poly(propylene adipate); fluoro elastomers and chloro-containing polymers derived from poly(alkylenes), poly(dienes) such as, poly(dichloroethyelene), poly(chlorofluoroethylene).

Thus, the curable elastomeric polymer can be an alkenyl-functional elastomeric polymer where the alkenyl group is selected from a hydrocarbon group containing 2 to 12 carbons such as vinyl, allyl, propenyl, butenyl, hexenyl, etc. The elastomeric polymers bearing such alkenyl functional groups may be derived from most of the elastomeric polymers, as described above, including poly(olefins) and poly(olefins-dienes) copolymers, and their derivatives: polymers and copolymers derived from olefinic monomers $C_2$ to $C_{12}$, dienes $C_4$ to $C_{12}$; polymers and copolymers of monoolefin, isomonoolefin and vinyl aromatic monomers: monoolefin $C_2$ to $C_{12}$, isomonoolefin $C_4$ to $C_{12}$, vinyl aromatic monomers including styrene, para-alkylstyrene, para-methylstyrene; examples include polymers derived from ethylene, propylene, isobutylene, isoprene, para-methylstyrene.

The curable elastomeric polymers can also be poly(dienes) and derivatives. Most of polymers, copolymers derived from dienes usually contain unsaturated ethylenic units on backbone or side-chains that are curable. Representative examples include polybutadiene, polyisoprene, polybutenylene, poly(alkyl-butenylene) where alkyl being $C_1$ to $C_{12}$, poly(phenyl-butenylene), polypentenylene, natural rubber (a form of polyisoprene); butyl rubber (copolymer of isobutylene and isoprene).

The curable elastomeric polymers can also be a halogenated olefin polymer. Representative examples of a halogenated olefin polymer include those polymers resulting from the bromination of a copolymer of isomonoolefin with para-methylstyrene to introduce benzylic halogen (as described in U.S. Pat. No. 5,162,445), halogenated polybutadienes, halogenated polyisobutylene, poly(2-chloro-1,3-butadiene), polychloroprene (85% trans), poly(1-chloro-1-butenylene) (NEOPRENE™), chlorosulfonated polyethylene. The brominated poly(isobutylene-co-para-methylstyrene) can be further cured via zinc oxide upon influence of heat.

The curable elastomeric polymers can also be polymers containing vinyl ether-, acrylate-, methyacrylate-, and epoxy-functional groups. Also, the elastomeric polymers can be hydroxyl terminal or hydroxy containing poly(oxyalkylenes) polymers, such as poly(oxyethylene), poly(oxypropylene), or poly(oxythylene-co-propylene) polymers.

The curable elastomeric polymer can be selected from reactive silane group-containing elastomeric polymers, mixtures of reactive silane group-containing elastomeric polymers, blends of reactive silane group-containing elastomeric polymers with conventional elastomeric polymers, mixtures or blends of conventional elastomeric polymers with reactive silane group containing silicone polymers. The reactive silane groups may be attached at the terminal and/or pendant positions on the polymer chain and the total number of these reactive silicone groups may be varied to provide a cured elastomeric structure with desirable properties. Representative silane-modified elastomeric polymers are silyated polymers and copolymers derived from olefins, such as the isobutylene polymers disclosed in U.S. Pat. No. 4,904,732, which is hereby incorporated by reference, isomonoolefin, dienes, ethylene or propylene oxides, vinyl aromatic monomers from $C_2$ to $C_{12}$ such as the silane-grafted copolymers of isomonoolefin and vinyl aromatic monomer as discussed in U.S. Pat. Nos. 6,177,519 B1 and 5,426,167. Commerical products illustrative of silyated propylene oxide polymers are the MS Polymers from Kaneka (Kanegafuchi Chemical Industry Co. Ltd. Tokyo, Japan and Kaneka America Corp, New York, N.Y.). Other representative silicon-modified elastomeric polymers are illustrated by, but not limited to; alkenylsilyl-functional elastomeric polymers such as vinylsilyl-, allylsilyl-, hexenylsilyl-containing elastomeric polymers that are curable to form and further the elastomeric polymer structure; and alkoxysilyl-functional elastomeric polymers such as polymers containing at least one alkoxylsilyl groups and/or their hydrolysates selected from methoxysilyl, dimethoxysilyl, trimethoxysilyl, ethoxysilyl, diethoxysilyl, triethoxysilyl, and methoxyethoxylsilyl.

In one embodiment of the present invention, the curable elastomeric polymer is selected from the silyated copolymers of an isomonoolefin and a vinyl aromatic monomer as described in U.S. Pat. No. 6,177,519 B1, which is hereby incorporated by reference. The silyated copolymers may be characterized as the addition product of an olefin copolymer radical created by contact of the copolymer with a free radical generating agent and an olefinically unsaturated, hydrolyzable silane wherein the silane adds to the polymer backbone to produce a silane grafted or silane modified copolymer product.

Illustrative examples of olefin copolymers suitable for modification with silanes to produce the silyated copolymers of this embodiment of the present invention comprise copolymers containing at least 50 mole % of at least one $C_4$ to $C_7$ isomonoolefin and from 0.1 up to 50 mole % of at least one vinyl aromatic monomer. Typically, the vinyl aromatic monomers are mono-vinyl aromatics such as styrene, alpha-methylstyrene, alkyl-substituted styrenes such as t-butylstyrene and para-alkyl substituted styrenes wherein the alkyl group contains from 1 to 4 carbon atoms, more preferably para-methylstyrene. Suitable isomonoolefin monomers include isobutylene and the like. Typically, 100% of the isomonoolefinic content of the copolymer comprises isobutylene. Typically, olefin copolymers include elastomeric copolymers comprising isobutylene and para-methylstyrene and containing from about 0.1 to 20 mole % of para-methylstyrene. These copolymers have a substantially homogeneous compositional distribution such that at least 95% by weight of the polymer has a para-methylstyrene content within 10% of the average para-methylstyrene content of the polymer. They are also characterized by a narrow molecular weight distribution Mw/Mn (where Mw is weight average molecular weight, and Mn is number average molecular weight) of less than about 5, alternatively less than about 3.5, a glass transition temperature ($T_g$) of below about −50° C. and a number average molecular weight (Mn) in the range of about 2,000 to 1,000,000, and alternatively from 10,000 to 50,000.

Suitable unsaturated organic silanes which can be reacted with the olefin copolymer backbone to produce the silyated copolymers of this embodiment are of the general formula RR'SiY$_2$ wherein R represents a monovalent olefinically unsaturated hydrocarbon or hydrocarbonoxy radical reactive with the free radical sites produced on the backbone polymer, Y represents a hydrolyzable organic radical and R' represents an alkyl or aryl radical or a Y radical. Where R is a hydrocarbonoxy radical, it should be non-hydrolyzable. In the preferred embodiment R may be a vinyl, allyl, butenyl, 4-pentenyl, 5-hexenyl, cyclohexenyl or cyclopentadienyl radical, with vinyl being the preferred radical. The group Y may be one or a mixture of $C_1$ to $C_4$ alkoxy radical such as methoxy, ethoxy, propoxy, or butoxy; Y may also be selected from acyloxy radicals such as formyloxy, acetoxy or propionoxy; oximo radicals such as —ON=C(CH$_3$)$_2$, —ON=C(CH$_3$)(C$_2$H$_5$) and —ON=C(C$_6$H$_5$)$_2$; or substituted amino radicals such as alkylamino or arylamino radicals, including —NHCH$_3$, —NHC$_2$H$_5$ and —NHC$_6$H$_5$ radicals. The group R' represents either an alkyl group, an aryl group or a Y group. The group R' can be exemplified by a methyl, ethyl, propyl, butyl, phenyl, alkylphenyl group or a Y group. Alternatively, R' is a methyl or alkoxy group. Typically, the silanes are those where R' and Y are selected from methyl and alkoxy groups, e.g., vinyltriethoxysilane, vinyltrimethoxysilane and methyl vinyl dimethoxysilane.

Typically, the free radical initiator used to create the silylated copolymers for this embodiment of the present invention is an organic peroxide compound having a half-life, at the reaction temperature, of less than one tenth of the reaction/residence time employed.

The water continuous emulsions comprising a curable elastomeric polymer can be selected from the emulsions described in U.S. application Ser. No. 09/905,660, which is hereby incorporated by reference. U.S. application Ser. No. 09/905,660 describes water-continuous emulsion composition comprising;

(A) 100 parts of a curable elastomeric polymer having a viscosity of 0.5–1,000,000 KPa-s and a glass transition temperature up to 50° C., (B) 3 to 30 parts surfactant (C) 0.5 to 50 parts of an internal cure additive (D) 5 to 45 parts water wherein the water-continuous emulsion has a solids content of greater than 75 weight %, an average particle size less than 5 μm, having sufficient stability to produce a stable lower solids emulsion upon dilution with water.

Component (B) of the compositions of the present invention is a polyurethane dispersion. "Polyurethane dispersion" as used herein describes stable mixtures of polyurethane polymers in water. Methods of preparing polyurethane dispersions are well known in the art and many of polyurethane dispersions are commercially available. Polyurethane polymers are generally characterized by their monomer content and most commonly involve the reaction of a diisocyanate with a polyol and chain extender. While the present inventors believe the polyurethane dispersion can be a stable aqueous mixture of any known polyurethane, typically the polyurethanes suitable for the use in the aqueous polyurethane dispersions are the reaction products (a) an isocyanate compound having at least two isocyanate (—NCO) functionalities per molecule; (b) a polyol having at least two hydroxy functionalities per molecule and a molecular weight ranging from 250 to 10,000 g/mole. The polyol may be selected from those commonly found in polyurethane manufacturing such as hydroxy-containing or terminated polyethers, polyesters, polycarbonates, polycaprolactones, polythioethers, polyetheresters, polyolefins, and polydienes. Suitable polyether polyols for the preparation of polyether polyurethanes and their dispersions include the polymerization products of cyclic oxides such as ethylene oxide, propylene oxide, tetrahydrofuran, or mixtures thereof. Polyether polyols commonly found include polyoxyethylene (PEO) polyols, plyoxypropylene (PPO) polyols, polyoxytetramethylene (PTMO) polyols, and polyols derived from the mixture of cyclic oxides such as poly(oxyethylene-co-polypropylene) polyols. Typical molecular weight of polyether polyols can range from 250 to 10,000 g/mole. Suitable polyester polyols for the preparation of polyester polyurethanes and their aqueous dispersions include; hydroxy-terminated or containing reaction products of ethylene glycol, propylene glycol, diethylene glycol, neopentyl glycol, 1–4, butanediol, furan dimethanol, polyether diols, or mixtures thereof, with dicarboxylic acids or their ester-forming derivatives.

Modified polyether polyurethanes such as polyetherester polyurethanes and polyethercarbonate polyurethanes may also be suitable polyurethanes for the preparation of aqueous polyurethane dispersions. These modified polyether polyurethanes can be derived by incorporating additional polyester polyols or polycarbonate polyols into polyether polyols during the polyurethane manufacturing.

Typically the polyurethane polymer useful to prepare the polyurethane dispersion as component (B) in the compositions of the present invention is selected from polyether polyurethanes, polyester polyurethanes, polycarbonate polyurethanes, polyetherester polyurethanes, polyethercarbonate polyurethanes, polycaprolactone polyurethanes, hydrocarbon polyurethanes, aliphatic polyurethanes, aromatic polyurethanes, and combinations thereof.

"Polyurethane dispersion" as used herein encompasses both conventional emulsions of polyurethane polymers, for example where a preformed polyurethane polymer is emulsified into an aqueous medium with the addition of surfactants and application of shear, and also includes stable mixtures of self-dispersing polyurethane polymers. Polyurethane dispersions of self-dispersing polyurethane polymers are well known in the art and many are commercially available. These polyurethane dispersions are generally free of external surfactants because chemical moieties having surfactant like characteristics have been incorporated into the polyurethane polymer and therefore are "self emulsifying" or "self dispersing". Representative examples of internal emulsifier moieties that can be incorporated into the polyurethane dispersions useful in the present invention include; ionic groups such as sulfontates, carboxylates, and quaternary amines; as well as nonionic emulsifier groups such as polyethers. Such polyurethane dispersions are well known in the art, and are typically prepared by either a one stage or two-stage process. Typically, a isocyanate-terminated polyurethane prepolymer is made from isocyanates, polyols, optional chain extender, and at least one monomer containing a hydrophilic group to render the prepolymer water dispersible. The polyurethane dispersion can then be prepared by dispersing the isocyanate-terminated polyurethane prepolymer in water with other polyisocyanates. Further chain extension can be affected by the addition of chain extenders to the aqueous dispersion. Depending on the choice of the hydrophilic group used to render the polyurethane polymer water dispersible, an additional reaction step may be needed to convert the hydrophilic group to an ionic species, for example converting a carboxyl group to an ionic salt or an amine to an amine salt or cationic quaternary group.

Representative, non-limiting examples of polyurethane dispersions that are suitable for use as component (B) in the compositions of the present invention, as well as general descriptions of techniques useful to prepare polyurethane dispersions can be found in U.S. Pat. Nos. 4,829,122, 4,921,842, 5,025,064, 5,055,516, 5,308,914, 5,334,690, 5,342,915, 5,717,024 5,733,967, 6,017,998, 6,077,611, 6,147,155, and 6,239,213.

Representative, non-limiting examples of commercially available polyurethane dispersions that are suitable for use as component (B) in the compositions of the present invention include: WITCOBOND W 290H, W-290H, W-296, and W213 (Uniroyal Chemical Division, Crompton Corporation, Middlebury, Conn.); DISPERCOLL U42, BAYHYDROL 121, and Bayhydrol 123 polycarbonate polyurethane dispersions (100 Bayer Road, Pittsburgh, Pa. 15025); SANCURE 2710 and 2715 aliphatic polyether polyurethane dispersions (Noveon, Inc. Cleveland, Ohio); NEOREZ R-966, R-967, R-9603 aliphatic polyurethane dispersions (NeoResins Division, Avecia, Wilmington, Mass.).

Optional component (C) is a cure agent. As used herein, a cure agent is any component added to the compositions of the present invention that enhances the curing of the coatings therefrom. One skilled in the art would be able to select an appropriate cure agent given the type of curable groups present on the curable elastomer polymer used in the water continuous emulsion of component (A). Generally, suitable curing agents are water dispersable materials selected from epoxies, silanes, polyaziridines, carbodimide, isocyanates, polyisocyanates, cyanurates, melamines and combinations thereof.

The amount of component (C) used is an amount to effectively cause curing of the coating compositions and will also vary depending on the type of curable groups present on the curable elastomeric polymer.

Representative, but non-limiting examples of typical cure agents useful in the present invention include: WITCOBOND XW from Crompton Corporation (CK Witco Corporation, Middlebury, Conn.); water-reducible melamine resins such as CYMEL 370, CYMEL 373 from CYTEC Industries Inc. (West Paterson, N.J.); polyfunctional aziridines such as IONAC XAMA-7, XAMA-220 from Sybron Chemicals Inc. (Birmingham, N.J.); water-reducible epoxy resins such as EPI-REZ Resin WD-510, and waterborne epoxy resins such as EPI-REZ 3522-W-60, both from Resolution Performance Products (Huston, Tex.; previously Shell Chemical Co.); silanes for aqueous cross-linking of the emulsion coatings include DOW CORNING 777 siliconate and 1–6634 aminopropyl siliconate (Dow Coming Corporation, Midland, Mich.).

Other additives can be optionally incorporated into the curable coating composition of this invention, as component (D), to derive additional specific features. Such additives include, but not limited to; reinforcing or extending fillers such as colloidal silica, fumed silica; colorants and pigments; stabilizers as thermal, UV, and weathering stabilizers; flame retardants, thickeners, biocides, and preservatives.

The curable emulsion coating composition typical of the present invention is a water-continous emulsion emulsion having a non-volatile solids content between 5% to 80% by weight. The non-volatile portion of the coating composition comprises the curable elastomeric polymer of component (A) from 5 to 60 parts, and the polyurethane polymer of component (B) from 40 to 95 parts, and the total solids of components (A) and (B) being 100 parts by weight. Alternatively, the component (A) is present from 10 to 50 parts and the component (B) from 50 to 90 parts; alternatively, the component (A) ranges from 20 to 50, and the component (B) ranges from 50 to 80 parts by weight. The curing agent (C) can be incoporated up to 10 parts, and the reinforcing additive component (D) can be present up to 40 parts, based on a 100 parts total of (A) and (B) components.

The curable coating compositions can be prepared by mixing components (A), (B), and optionally (C) and (D) by any of the techniques known in the art such as milling, blending, and stirring, either in a batch or continuous process. The technique and particular device selected is determined by the viscosity of the components and final curable coating composition. The curable coating compositions can be prepared by one of two mixing procedures, depending on the type of polyurethane dispersion, and the relative ratio of curable elastomers in component (A) to the polyurethane polymer in component (B). When preparing a coating composition comprising an acid curable emulsion of an elastomer such as a silylated poly(isobutylene) (abbreviated SiPIB) and polyurethane dispersions of pH 7.0 or higher (i.e. neutral or anionic types of polyurethane dispersion), the pH can be first adjusted to raise the pH of the curable SiPIB emulsion with an alkaline additive such as colloidal silica (or alternatively, a base compound such as 2-amino-2-methyl-1-propanol, AMP) to 6.0 or higher, prior to incorporating the selected polyurethane dispersions. In these types of coating compositions, the pH should be maintained at a value of 6.0 or above, to ensure stability and compatibility. The final pH of the mixture disclosed in this invention varies, depending upon the choice of polyurethane dispersion.

The other method of coating preparation relates to the coating compositions comprising an acidic curable elastomeric emulsion and an acidic polyurethane dispersion. In such cases, the final coating mixtures are acidic and no pH adjustment is needed, as the individual components and finished coating are all acidic and compatible.

The curable coating composition can also be prepared by adding the mixture of components (B), (C), and (D) into component (A) through a dynamic or static mixer to result in a uniform coating composition. This method is particularly desirable in a continuous operation, provided sufficient shear and mixing time can be realized.

The curable compositions can be applied to a variety of substrates, such as fabrics, fibers, yarns, textiles and films according to known techniques. These techniques include, but not limited to, knife coating, roll coating, dip coating, flow coating, squeeze coating, and spray coating. Knife coating includes knife-over-air, knife-over-roll, knife-over-foam, and knife-over-gap table methods. Roll coating includes single-roll, double-roll, multi-roll, reverse roll, gravure roll, transfer-roll coating methods.

The curable compositions can also be applied to wet fabrics, immediately following a scouring operation. The compositions provide good adhesion to the fabric surface, and dries to a uniform coating without imperfections.

Step (II) of the method of the present invention is exposing the layer of the curable composition on the substrate to air for sufficient time to form a cured coating. Step (II) can be accelerated by increasing the temperature at which this step is performed, for example, from about room temperature to about 180° C., alternatively from room temperature to about 150° C., or alternatively from about room temperature to about 130° C., and allowing the coating to cure for a suitable length of time. For example, the coating composition typically cures in less than about 3 min at 150° C.

An alternative embodiment of the present invention provides a method for coating a substrate comprising the steps of:

(I) applying a first layer on the substrate of a curable composition comprising;

(A) a water continuous emulsion comprising a curable elastomeric polymer having a viscosity of 0.5–1,000,000 KPa-s and a glass transition temperature up to 50° C.,
(B) an aqueous polyurethane dispersion, and optionally
(C) a cure agent,
(II) exposing the first layer to air for sufficient time to form a cured first coating,
(III) applying a second layer on the cured first coating of a composition comprising a polyorganosiloxane-based elastomeric material,
(IV) exposing the second layer to air for sufficient time to form a cured second coating.

In this alternative embodiment, steps (I) and (II) are the same as described previously. Step (III) is applying a second layer on the cured first coating of a composition comprising a polyorganosiloxane-based elastomeric material. The polyorganosiloxane-based elastomeric material can be any silicone based material known in the art for coating substrates, and in particular, fabric or textile substrates. Alternatively, polyorganosiloxane-based elastomeric material can be chosen from the class of silicones known in the art as liquid silicone rubber. Alternatively, the polyorganosiloxane-based elastomeric materials which may be useful as a second layer in Step (III) are described for example in U.S. Pat. No. 6,037,279, which is hereby incorporated by reference. The techniques for applying the second layer can be the same as those described previously for Step (I). Step (IV) is exposing the second layer to air for sufficient time to form a cured second coating. The techniques for exposing the second layer to air for sufficient time to form a cured second coating can be the same as those described for Step (II) above. In a similar manner, Step (IV) can be accelerated by increasing the temperature at which this step is performed, for example, from about room temperature to about 180° C., alternatively from room temperature to about 150° C., or alternatively from about room temperature to about 130° C., and allowing the coating to cure for a suitable length of time. For example, the coating composition typically cures in less than about 3 min at 150° C.

Substrates can be coated with various amounts of the compositions described above and cured. The coat weight, or coating weight, as used herein describes the net amount of dried coating material deposited onto a substrate. The coating weight on a given substrate or fabric is the difference between the gross weight of a dried coated substrate or fabric and the weight of a dried substrate or fabric having a same dimension. The method for determining the coated and uncoated fabric is similar to ASTM D3776. Typical coating weight ranges for the coatings of the present invention are 10 to 120 g/m$^2$ (gsm) (or 0.28 to 3.4 ounces/square yard), alternatively, the range for the coating weight is 10 to 80 g/m$^2$ (or 0.28 to 2.28 ounces/square yard), or alternatively the coating weight is 10 to 60 g/m$^2$ (or 0.42 to 1.7 ounces/ square yard). When a two-coat system is used, as described above in the alternative embodiment, the coating weight range for the second coating is 5 to 50 g/m$^2$ (or 0.14 to 1.43 ounces/square yard); alternatively the second coating range is 5 to 30 g/m$^2$ (or 0.14 to 0.86 ounces/square yard); or alternatively is 10 to 20 g/m$^2$ (or 0.28 to 0.57 ounces/square yard).

Coated substrates prepared according to the methods of the present invention have excellent mechanical properties resulting from the cured coatings on the substrate. Furthermore, the methods of the present invention provide coated substrates with improved air/gas retention properties at relatively low coating weights which make them useful in the manufacture of airbag and inflatable curtains that require long hold-up time during deployment.

EXAMPLES

The following examples are presented to further illustrate the compositions and methods of this invention, but are not to be construed as limiting the invention, which is delineated in the appended claims. All parts and percentages in the Examples are on a weight basis and all measurements were obtained at about 23° C., unless indicated to the contrary.

The particle size and profile of the formed emulsion coating compositions were evaluated using a MALVERN MASTERSIZER S (Malvern Instruments, Malvern, UK) equipped with 300 RF mm range lens to detect particle size in the range 0.05 to 900 μm. The particle size profile indicates the stability and compatibility of mixture emulsion coatings. The particle size profile of an emulsion coating is reported using these three parameters: D(v, 0.5), D(v, 0.9) and span. D(v, 0.5) is referred as the average particle size and is the size of particle at which 50% of the sample is smaller and 50% is larger than this size. This value is also known as the mass medium diameter. D(v, 0.9) gives a size of particle for which 90% of the sample is below this size. Span is the measurement of the width of the particle size distribution and is the ratio of [D(v, 0.9)–D(v, 0.10)] to D(v, 0.5). No significant changes in the particle size were observed in these emulsion coatings.

Materials

The following materials, listed alphabetically for ease of reference, were employed in the examples.

AMP 95 is a 95% aqueous solution of 2-amino-2-methyl-1-propanol and is useful for raising the pH of the water-continuous emulsion.

DC 3715 is produced by Dow Corning (Midland, Mich.) and is currently used in the airbag coating industry for pressurized air bags and inflatable curtains. This is supplied as two-part silicones (A and B parts) that cures to a low friction surface.

DC 3730 LSR is produced by Dow Corning (Midland, Mich.) and is currently used in the airbag coating industry for pressurized air bags and inflatable curtains. This is supplied as two-part silicones (A and B parts) comprising vinyl-functional silicone fluids, hydride-functional fluids, platinum catalyst, silica filler and others.

Nalco 1050 is a colloidal silica dispersion, used as obtained from Nalco Chemical Company (Chicago, Ill.), containing 50% silica (as $SiO_2$), having a pH of 9.0. (Other alkaline colloidal silica such as NALCO 1030, NALCO 1130, can be used in placed of Nalco 1050 as well.)

PU dispersion 1 is WITCOBOND W-290H which is a 62 wt. % solids anionic polyurethane dispersion of an aliphatic polyester urethane commercially available from Crompton Corporation (CK Witco Corporation, Middlebury, Conn.), and prepared from components containing isophthalic acid, polymer with adipic acid, hexanediol, dimethylolpropanoic acid, and 1,1-methylbis[isocyanatocyclohexane]. The product has a pH value between 7.0 and 9.0, and an average viscosity of 400 cps.

PU dispersion 2 is DISPERCOLL U42, an aqueous polyurethane dispersion produced by Bayer Corporation (100 Bayer Road, Pittsburgh, Pa. 15025). This polyurethane dispersion comprises a linear polyester urethane based on hexamethylene diisocyanate (HDI) and is an anionic polyurethane dispersion at 50 wt. % solids in water having a pH of 7 and a viscosity of 500 centipoises.

PU dispersion 3 is SANCURE 2715, an aqueous dispersion of an aliphatic polyether urethane polymer, used as provided from Noveon, Inc. (Cleveland, Ohio; formally BF Goodrich). This polyurethane dispersion is an anionic dispersion, having 38 wt. % solids, a pH of 9.0, and a viscosity of 750 cps.

PU dispersion 4 is WITCOBOND W-213, a cationic polyurethane dispersion used as supplied from Crompton Corporation (Greenwich, Conn.).

PU Dispersion 5 is WITCOBOND W-296, an anionic aqueous dispersion of a polyester polyurethane from Crompton Corporation (Greenwich, Conn.), having 61 wt. % solids, a pH of 8.5 and a viscosity of 260 cps.

SiPIB emulsion 1 is a curable emulsion of a 75.0 wt. % solids non-ionic emulsion of dimethoxysilyl-functional poly(isobutylene-co-paramethylstyrene) (SiPIB) copolymer (curable elastomeric polymer) containing isostearic acid as an curable additive, prepared utilizing a lab-scale mixer according to the method taught in the U.S. patent application Ser. No. 09/905,660. This silane-grafted PIB copolymer had a zero-shear viscosity of 1.5 MM poise. The resulting emulsion had a pH of 4.0 to 4.5, and an average particle size of 0.532 μm. This SiPIB emulsion had excellent shelf stability as exhibited by its stable particle size distribution with time.

SiPIB emulsion 2 is a non-ionic curable emulsion of a dimethoxysilyl-functional poly(isobutylene-co-paramethylstyrene) (SiPIB) copolymer (curable elastomeric polymer) containing isostearic acid as a curable additive, made on a twin-screw extruder having a wt. % solids of 78.8 in water according to the method disclosed in U.S. patent application Ser. No. 09/905,660.

SiPIB emulsion 3 is an emulsion of EPION 500S silane-terminated polyisobutylene homopolymer prepared according to the method of U.S. patent application Ser. No. 09/905,660. EPION 500S is a dimethoxysilyl-terminated polyisobutylene with a number-average molecular weight of 17,000 g/mole, obtained commercially from Kaneka Corporation. This emulsion had a D(v, 0.5) average particle size of 0.32 um, a pH value of 3.3, and a % solids of 76.0 by weight.

Witcobond XW is a 55 wt. % solids aqueous epoxy dispersion having an epoxide equivalent weight of 365 gm and a viscosity of 840 centipoise, and was used as obtained from Crompton Corporation (Middlebury, Conn.).

Examples 1–2

Curable SiPIB/PU Emulsion Coatings

Curable elastomeric emulsion coatings suitable as fabric coatings for airbags and inflatable curtains are illustrated in these examples. The coatings were the mixture products of the emulsion of curable SiPIB polymer and polyurethane dispersions, and additional optional additives including colloidal silica, curing agent in emulsion, biocide and antifoam. Stable emulsion coatings were prepared to about 60 wt. % solids with specified SiPIB/PU ratios, Example 1's formulation having a 55/45 ratio and Example 2's formulation having a 50/50 ratio based on the solids part of the coating composition. The stability of these coatings was excellent, as exemplified by their particle size profiles.

The Example 1 coating composition was prepared by incorporating Nalco 1050 colloidal silica into the curable SiPIB emulsion 2 to adjust the pH to be greater than 6.0, and then mixed to uniformity. PU dispersion 3 and PU dispersion 5 were incorporated and mixed to uniformity. Other optional ingredients were added to the mixture to complete the coating compositions which included; WITCOBOND XW aqueous epoxy crosslinker (Crompton Corp.), TEKTAMER 38 A.D. biocide, and Dow Corning 1400 antifoam. The Example 1 coating formulation had a pH value of 6.9 and a non-volatile solids percent of 59.4 by weight.

The Example 2 coating composition was prepared from curable SiPIB emulsion, SANCURE 2715 polyurethane dispersion and DISPERCOLL U 42 polyurethane dispersion (Bayer Corp., Pittsburgh, Pa.).

Composition details for Examples 1 and 2 are summarized in Table 1 along with emulsion properties and resulting properties of the cured films resulting from these compositions. The mechanical properties of the cured coatings shown in Table 1 was derived from the testing of a cured coating film/sheet that was cast from the mixture coating, and tested utilizing a MTS tensile tester (Material Testing System Corporation, Eden Prairie, Minn.) according to the method in ASTM 412.

TABLE 1

| Patent examples | 1 | 2 |
| --- | --- | --- |
| SiPIB/PU ratio | 55/45 | 50/50 |
| SiPIB emulsion 2 (78.8% solids) | 26.7 g | 25.4 g |
| PU Dispersion 3 (38% solids) | 22.6 g | 13.2 g |
| PU Dispersion 5 (60% solids) | 14.3 g | |
| PU Dispersion 2 (50% solids) | | 30.0 g |
| Witcobond XW (55% solids) | 1.39 g | 1.45 g |
| Nalco 1050 (50% solids) | 3.82 g | 4.0 g |
| Tektamer 38 A.D. | 0.0700 g | 0.09987 g |
| Dow Corning 1400 antifoam | 0.0301 g | 0.0319 g |
| Wt. % solids | 59.4 | 57.8 |
| pH @ 25° C. | 6.9 | 6.6 |
| Emulsion particle size | | |
| D(v, 0.5), μm | 0.588 | 0.353 |
| D(v, 0.9), μm | 1.79 | 1.05 |
| Span | 2.8 | 2.65 |
| Initial mechanical property | | |
| Tensile, psi | 1212 | 618 |
| % Elongation | 487 | 743 |
| Modulus at 100%, psi | 188 | 80 |
| After heat aged @ 107° C., for 4 days | | |
| Tensile, psi | 1152 | 840 |
| % Elongation | 471 | 742 |
| Modulus at 100%, psi | 215 | 106 |

Examples 3–4

Curable SiPIB/PU Emulsion Coatings with Thermal and Hydrolytic Aging Stability

In these example, coatings with excellent thermal and hydrolytic stability were prepared according to a similar procedure as that of Example 2. The coating mixtures were prepared by incorporating Nalco 1050 colloidal silica into the curable SiPIB emulsion 2 to raise the pH, anionic polyurethane dispersions Sancure 2715 (PU Dispersion 3) (commercially obtained from Noveon Corp., previously BF Goodrich) and Dispercoll U42 (PU Dispersion 2) (commercially obtained from Bayer Corp.) were incoporated and mixed to form a homogeneous mixture. Witcobond XW epoxy emulsion crosslinker and Polacryl BR-300 thickener were added to further adjust the cure chemistry and viscosity of the formulated mixture. Both examples 3 and 4 had a SiPIB/PU ratio of 50/50 by weight based on the solids.

The cured coatings exhibited excellent thermal and hydrolytic aging stability as illustrated by the good retention of mechanical properties. Mechanical property data for 4 days of thermal aging at 107° C., and after 6 days of aging at 80° C. and 95% R.H. (relative humidity) is summarized in Table 2.

TABLE 2

| Patent example | 3 | 4 |
|---|---|---|
| SiPIB/PU ratio | 50/50 | 50/50 |
| SiPIB emulsion 2 (78.8% solids) | 25.4 g | 25.4 g |
| PU Dispersion 3 (38% solids) | 39.5 g | 26.3 g |
| PU Dispersion 2 (50% solids) | 10.0 g | 20.0 g |
| Witcobond XW (55% solids) | 1.45 g | 1.45 g |
| Nalco 1050 | 4.0 g | 4.0 g |
| Polacryl BR-300 (30% solids) | 0.40 g | 0.40 g |
| Property of cured coating, initial | | |
| Tensile, psi | 1336 | 1031 |
| % Elongation | 547 | 650 |
| Modulus at 100%, psi | 212 | 137 |
| After heat aged @ 107° C., for 4 days | | |
| Tensile, psi | 1369 | 977 |
| % Elongation | 436 | 557 |
| Modulus at 100%, psi | 307 | 183 |
| After aged @ 80° C./90% RH for 6 days | | |
| Tensile, psi | 1390 | 989 |
| % Elongation | 468 | 572 |
| Modulus at 100%, psi | 300 | 174 |

Examples 5–8

Air Bag Coatings Based on Curable SiPIB/PU Emulsions

The effectiveness of the compositions representative of this invention as coatings for airbag applications were evaluated via an air deployment test using T-shaped airbags woven from Nylon 6,6 polyamide multi-filament yarns. The T-shaped airbags (or T-bag in short) were produced from woven fabrics using one-piece woven (OPW) technology with 470 dtex (or 235 gm/m$^2$) woven specification and had a surface area of 0.0454 to 0.04796 m$^2$ per side. The coatings were applied onto the airbag fabrics using the knife-over-air method on a Werner Mathis U.S.A. lab-coater (Concord, N.C.). The coated airbags were flash dried for 1 minute at 100° C., followed by curing for 3 minutes at 130° C. The coated T-bags were then evaluated for air deployment and rentention using a lab testing unit constructed at Dow Corning Corporation (Midland, Mich.). The deployment testing involved mounting the T-bag onto the testing device through the openings of the bags. A pressurized canistor with a predetermined amount of air was then "bombed" (i.e. quickly released) into the T-bag such that the initial peak pressure reached 3.5 bar (350 KPa) inside the T-bag. The air pressure inside the T-bag was constantly monitored and graphed as a function of time. The time required to deflate down to 0.5 bar (50 KPa) of pressure was reported as the T-bag deployment hold-up time.

The compositions of Examples 3 and 4 were coated, each one at two different coating weights, onto T-bags and tested as described above. The coat weights and corresponding T-bag deployment test results are summarized in Table 3. These representative results demonstrate an excellent and effective gas barrier at a very low coat weight level.

TABLE 3

| Patent example | 5 | 6 | 7 | 8 |
|---|---|---|---|---|
| Coat weight, g/m$^2$ (gsm) | 32 | 50 | 36 | 55 |
| T-bag Deployment hold-up, seconds | 9.4 | 23.7 | 9.8 | 31 |

Examples 9–11

Performance of Two-Coat Airbags: SiPIB/PU Base Coat, Silicone Topcoat

Two coat treated T-bags were prepared to demonstrate the usefulness of the curable coating in such systems. Current industry practice utilizes a silicone-based coating, either alone or as application of a topcoat to achieve low coefficient of friciton, low surface energy, and a tack free surface. The coefficient of friction of the coated fabrics and woven fabrics is an important property, as it is indicative of the energy required to separate the two coated surface that come in contact. For coated fabrics, airbags, and inflatable curtains, a coefficient of friction of 0.5 or lower is preferred for fast deployment. The coefficient of friction property was measured on a TMI Slip and Friction test unit (Testing Machines Inc., Amityville, N.Y.) that is similar to ASTM 1894.

As shown in Table 4, airbags with less than 0.5 coefficient of friction were obtained through one of the two options: one-coat with SiPIB/PU waterborne coating (Example 9) over Nylon 6,6 polyamide woven fabric at a relatively low coat weight, or a two-coat approach with SiPIB/PU waterborne coating being the base coat, and liquid silicone rubber (LSR) as top coat (Example 10). Use of a silicone topcoat is particularly desirable when the curable SiPIB/PU coating is applied to give a relatively heavy coat weight, as in the case of Example 11, since the coefficient of friction is high.

TABLE 4

| Patent examples | 9 | 10 | 11 |
|---|---|---|---|
| Coated airbag number | Airbag 1 | Airbag 2 | Airbag 3 |
| Coat weight on airbag, g/m$^2$ | 36 | 36 | 75 |
| Coating method | knife-over-air | knife-over-air | knife-over-roll |
| Silicone topcoat, DC 3715 | No | 2–8 g/m$^2$ | no |
| Topcoat method | | Rotogravure | |
| T-bag deployment hold-up time, seconds | 9 second | 9 second | 26 seconds |
| Coefficient of friction | | | |
| Static | 0.43 | 0.406 | 2.185 |
| Kinetic | 0.279 | 0.237 | 0.896 |
| Scrub test, # cycles passed | 250 | 1000 | |

Example 9 was prepared by applying a curable SiPIB/PU waterborne coating directly over a one-piece-woven T-bag, then cured, following the procedure described previously. The dried coating has a coat weight of 36 g/m2 (gsm).

Example 10 illustrated the two-coat T-bag to which Dow Corning 3715 liquid silicone rubber (LSR) was applied using a Rotogravure coater to give about 5–8 g/m$^2$ coat weight on top of a 36 g/m$^2$ SiPIB/PU basecoat. These examples show a two-coat airbag can be prepared to give excellent air barrier, as indicated by high deployment hold-up time, and low coefficient of friction.

The presence of a silicone topcoat reduced the coefficient of friction, both static and kinetic, as well as the scrub test. The scrub test is a test to investigate the surface lubricity and coating adhesion to fabric substrate as well as in-between coats. The scrub test unit was manufactured by Meadowbank Innovations Limited (Penllyn, Cowbridge, U.K.). The silicone top-coated airbag in Example 10 passed 1000 cycles, while the airbag without topcoat passed 250 cycles.

Examples 12–15

Curable SiPIB/PU Coatings Prepared at Different SiPIB/PU Ratios and with Thermal and Hydrolytic Aging Stability Stable coating compositions were prepared to a SiPIB/PU ratio, based on the non-volatile solids, of 30/70 using polyurethane dispersions selected individually from or mixtures of PU Dispersions 2, 3, and 5. The exact compositions are summarized in Table 5 below. As illustrated, the prepared mixture coatings had good particle size profile with D(v, 0.5) average particle size mostly below 0.5 $\mu$m and D(v, 0.9) below 2.0 $\mu$m.

TABLE 5

| Patent examples | 12 | 13 | 14 | 15 |
|---|---|---|---|---|
| SiPIB/PU ratio | 30/70 | 30/35/35 | 30/35/35 | 30/70 |
| SiPIB emulsion 2 (78.8% solids) | 19.0 g | 19.0 g | 19.0 g | 19.0 g |
| PU Dispersion 3 (38% solids) | 92.1 g | 46.1 g | 46.1 g | |
| PU Dispersion 2 (50% solids) | | 35.0 g | | |
| PU Dispersion 5 (60% solids) | | | 29.2 g | 58.4 g |
| Nalco 1050 (50% solids) | 4.0 g | 4.0 g | 4.0 g | 4.0 g |
| Witcobond XW (55% solids) | 1.10 g | 1.10 g | 1.10 g | 1.10 g |
| Polacyl BR-300 (30% solids) | 0.60 g | 0.55 g | 0.55 g | 0.30 g |
| Wt. % solids | 45.4 | 49.7 | 52.6 | 63.3 |
| pH @ 25° C. | 7.75 | 7.586 | 7.679 | 7.567 |
| Particle size, D(v, 0.5), $\mu$m | 0.664 | 0.387 | 0.464 | 0.419 |
| D(v, 0.9), $\mu$m | 1.8 | 1.28 | 1.5 | 1.43 |
| Span | 2.44 | 3.01 | 2.96 | 3.13 |

The compositions of Examples 12–15 were applied and tested on the T-bag samples, as described previously. Upon water removal, the coatings dried and co-cured to form a uniform film structure with excellent uniformity stability. The mechanical property of the cured coated as-prepared are summarized as Examples 16 to 19 in Table 6 below. The same property was measured after aging at 107° C. for 4 days, and after aging at 80° C./90% R.H., respectively. Examples 16 and 17 showed not only good initial tensil and elongation property, but also showed the minimal changes after thermal and humidity aging tests. Airbags coated with these low SiPIB/PU ratio coatings had excellent air retention at relatively low coat weight, as indicated by airbag deployment hold-up time shown in Table 6.

TABLE 6

| Patent examples (coated airbags) | 16 | 17 | 18 | 19 |
|---|---|---|---|---|
| Coating patent example | 12 | 13 | 14 | 15 |
| Airbag deployment hold-up time, seconds | 13.08 | 8.61 | 6.62 | 12.53 |
| Coat wt. On T-bag; g/m2 | 24.5 | 31.3 | 28.9 | 40.7 |
| Property of cured coating, initial | | | | |
| Tensile, psi | 2853 | 2237 | 2173 | 2159 |
| % Elongation | 449 | 605 | 484 | 586 |
| Modulus at 100%, psi | 695 | 368 | 415 | 217 |
| After heat aged @ 107° C., for 4 days | | | | |
| Tensile, psi | 3547 | 1709 | 1887 | 944 |
| % Elongation | 438 | 483 | 528 | 551 |
| Modulus at 100%, psi | 979 | 388 | 372 | 158 |
| After humidity aged @ 80° C./90% RH | | | | |
| Tensile, psi | 2402 | 1977 | 1214 | 189 |
| % Elongation | 471 | 658 | 567 | 490 |
| Modulus at 100%, psi | 595 | 338 | 249 | 71 |

Comparison Examples 20–26

Silicone Coating vs. SiPIB/PU Coated T-Bag Performance

The air barrier and retention properties representative of the coatings of the present invention (compositions from Examples 3 and 4 above) were compared to a commercially available silicone-based coating, DC 3730 LSR, that is commonly used in the industry as an airbag coating. Formulation details and summary of performance testing are summarized in Table 7 below.

The silicone coating thermally cured to form a crosslinked silicone coating matrix with good mechanical properties. However, to achieve useful deployment hold-up time of 5 seconds of higher, a high coat weight over Nylon 6,6 airbag was required, as illustrated in Examples 20 to 22. Additionally, the LSR coated airbags had relatively poor thermal aging stability, as shown in Example 22.

The SiPIB/PU aqueous coatings representative of this invention, on the other hand, have excellent air barrier/retention property. As shown in Examples 23 through 26, coatings with coat weight of 32 to 36 g/m$^2$ provided deployment hold-up time approaching 10 seconds. At a coat weight of 50 to 55 g/m$^2$, the coated airbags had deployment time in excess of 24 seconds.

TABLE 7

| Patent example | 20 | 21 | 22 | 23 | 24 | 25 | 26 |
|---|---|---|---|---|---|---|---|
| Coating type | 3730 LSR | 3730 LSR | 3730 LSR | SiPIB/PU | SiPIB/PU | SiPIB/PU | SiPIB/PU |
| Patent example compostion | | | | 3 | 3 | 4 | 4 |
| Coat wt., g/m$^2$ | 35 | 70 | 130 | 32 | 50 | 36 | 55 |
| T-bag deployment hold-up | | | | | | | |
| Initial (seconds) | 0.65 | 4.23 | 24.5 | 9.4 | 23.7 | 9.8 | 31 |
| Aged 400 hrs @ 107° C. | <0.2 | 2.66 | 6.56 | 6.5 | | 7.6 | 23.3 |
| Aged 240 hrs @ 80° C./90% RH | | | 7.8 | 8.9 | 38.6 | 12.1 | 26.6 |

Examples 27–30
Methods of Applying Curable SiPIB/PU Coating on Airbag Fabric (Two or Multiple Passes vs. One Pass)

The curable SiPIB/PU emulsion coating formulation used in these examples is shown in Table 8. The SiPIB emulsion 2 was used except the weight % solids in this particular sample was 81.1 wt. %. Polyacryl BR-300 aqueous polyurethane thickening agent (Polacryl Inc., Stamford, Conn.) was used to adjust the viscosity, Tektamer 38 AD biocide, obtained from Star Chemical Co., Ltd., was used as preservative. Dow Corning antifoam 1400, manufactured by Dow Corning Corp., was used as antifoam processing aid.

The finished coating composition has a solids content of 52.4% by weight, a pH value of 7.6, and the following particle size profile: D(v, 0.5) of 0.42 μm, and D(v, 0.9) of 1.52 μm, and span of 3.37.

TABLE 8

| Patent example | 27 |
|---|---|
| Material | Weight parts |
| SiPIB emulsion 2 (81.1% solids) | 29.1 |
| Nalco 1050 (51.7% solids) | 4.62 |
| PU Dispersion 3 (36.1% solids) | 51.9 |
| PU Dispersion 2 (51.5% solids) | 12.2 |
| Witcobond XW (55.0%) | 1.72 |
| Polyacryl BR-300 (30.0%) | 0.370 |
| Tektamer 38 AD | 0.127 |
| Dow Corning antifoam 1400 | 0.0397 |

The effect of coating application methods on the airbag hold-up time during deployment test using the formulation of Example 27 is summarized in Table 9. Examples 28 and 29 show the airbag hold-up performance of the T-bags coated in one pass to a coat weight of 16.50 and 24.34 g/m2, respectively. Example 30 summarizes the performance when the T-bag was coated in two passes, with a similar weight to that of Example 29, yet the air hold-up time during deployment was significantly better than that of Example 29.

TABLE 9

| Patent example | 28 | 29 | 30 |
|---|---|---|---|
| Patent composition example | 27 | 27 | 27 |
| Number of passes | 1 | 1 | 2 |
| Coat weight, g/m² | 16.50 | 24.34 | 25.61 |
| Deployment hold-up time, seconds | 6.1 | 17.62 | 22.4 |

Examples 31–32
Mfg-Scale Coating Application of One- and Two-Coat Airbags

Curable waterborne coatings, representative of this invention were applied onto full-size woven airbag fabrics with a manufacturing-scale knife coater using several different knife blades styles. The best coverage and coating quality was obtained using a knife-over-foam set-up with a J-blade (Blade 17 design, Mascoe systems corporation, Mauldin, S.C.). A rectangular blade (Blade 27D, Mascoe systems corp.) over gap table was used to obtain higher coat weights with good coating quality. For two-coat airbags, the same J blade, rectangular blade, or a custom-cut blade (blade 14B, Mascoe Systems Corp.) was used for applying silicone topcoat.

The results of these trials, summarized in Table 10 below, shows the average coat weight and deployment times for one-coat and two-coat T-bags coated with the curable SiPIB/PU coating composition of Example 27 using a knife-over-foam table with the above described knife blade designs. Dow Corning 3715 silicone was used as the topcoat in the two-coat T-bags. Also shown in Table 9 are the thermal and hydrolytic aging stability of the coated airbags. The one-coat and two-coat T-bags were subjected to 107° C. thermal aging for 400 hrs, and 80° C./95% R.H. for 240 hrs, respectively.

TABLE 10

| Patent example | 31 | 32 |
|---|---|---|
| Coat weight of SiPIB/PU, g/m² | 27.8 | 27.8 |
| DC 3715 Silicone topcoat, g/m² | 0 | 20 |
| T-bag deployment hold-up, initial | 10.6 seconds | 12.4 seconds |
| After aged 400 hrs at 107° C. | 12.0 seconds | 7.3 seconds |
| After aged 240 hrs at 80° C./ 95% R.H | 15.7 seconds | 12.1 seconds |

The above examples illustrate the excellent film forming capability of the coatings over fabric and airbag substrates, excellent air retention of the coated airbags and inflatable curtains during deployment, the thermal and hydrolytic stability of the cured coatings and coated airbags, and the versatility for making one-coat and two-coat fabrics and airbags. In the case of two-coat systems, the silicone topcoat provides low coefficient of friction, non-tackiness feel, and flame retardancy to the coated fabric and airbags.

That which is claimed:

1. A method for coating a substrate comprising the steps of:
   I applying a layer on the substrate of a curable composition comprising:
   (A) a water continuous emulsion comprising a curable elastomeric polymer having a viscosity of 0.5–1,000,000 KPa-s and a glass transition temperature up to 50° C., wherein the curable elastomeric polymer is a silylated polymer derived from elastomeric polymers selected from natural rubber, polyolefins, poly (olefin-diene)s, polydienes, butyl rubber, nitrile rubber, chloroprene rubber, fluorocarbon elastomers, polysulfide rubbers, polyurethanes and combinations thereof,
   (B) an aqueous polyurethane dispersion, and optionally
   (C) a cure agent
   (II) exposing the layer to air for sufficient time to form a cured coating.

2. The method of claim 1 wherein the silylated polymer is the reaction product of:
   a) an olefin copolymer comprising at least 50 mole % of at least one $C_4$ to $C_7$ isomonoolefin and at least one vinyl aromatic monomer
   b) a silane of the general formula $RR'SiY_2$ wherein R represents a monovalent olefinically unsaturated hydrocarbon or hydrocarbonoxy radical, each Y represents a hydrolyzable organic radical and R' represents an alkyl radical, an aryl radical or a Y radical; and
   c) a free radical generating agent.

3. The method of claim 2 wherein the silylated polymer comprises at least 60 mole % of at least one $C_4$ to $C_7$ isomonoolefin.

4. The method of claim 2 wherein the silylated polymer comprises at least 80 mole % of isobutylene and from 0.1 up to 20 mole % of para-alkylstyrene.

5. The method of claim 1 wherein the aqueous polyurethane dispersion comprises a polyurethane selected from polyether polyurethanes, polyester polyurethane, polycarbonate polyurethanes, polyetherester polyurethanes, polyethercarbonate polyurethanes, polycaprolactone polyurethanes, hydrocarbon polyurethanes, aliphatic polyurethanes, aromatic polyurethanes, and combinations thereof.

6. The method of claim 1 wherein the cure agent is added and is a water dispersible material selected from epoxies, silanes, polyaziridines, carbodimide, isocyanates, polyisocyanates, cyanurates, melamines and combinations thereof.

7. The method of claim 4 wherein the polyurethane dispersion comprises a polyether polyurethane.

8. The method of claim 1 wherein the curable composition further comprises:

(D) an additive selected from fillers, colloidal silica, fumed silica, colorants, pigments, UV stabilizers, thermal stabilizers, weathering stabilizers, flame retardants, thickeners, biocides, and preservatives.

9. The method of claim 1 wherein the substrate is a fabric.

10. The method of claim 1 wherein the substrate is an airbag fabric.

11. A method for coating a substrate comprising the steps of:

(I) applying a first layer on the substrate of a curable composition comprising;
  (A) a water continuous emulsion comprising a curable elastomeric polymer having a viscosity of 0.5–1,000,000 KPa-s and a glass transition temperature up to 50° C.,
  (B) an aqueous polyurethane dispersion, and optionally
  (C) a cure agent,
(II) exposing the first layer to air for sufficient time to form a cured first coating,
(III) applying a second layer on the cured first coating of a composition comprising a polyorganosiloxane-based elastomeric material,
(IV) exposing the second layer to air for sufficient time to form a cured second coating.

12. The method of claim 11 wherein the substrate is a fabric.

13. The method of claim 11 wherein the substrate as an airbag fabric.

14. A coated substrate prepared by the method of claim 1.
15. A coated substrate prepared by the method of claim 2.
16. A coated substrate prepared by the method of claim 3.
17. A coated substrate prepared by the method of claim 4.
18. A coated substrate prepared by the method of claim 5.
19. A coated substrate prepared by the method of claim 6.
20. A coated substrate prepared by the method of claim 7.
21. A coated substrate prepared by the method of claim 8.
22. A coated fabric prepared by the method of claim 9.
23. A coated airbag fabric prepared by the method of claim 10.
24. A coated substrate prepared by the method of claim 11.
25. A coated fabric prepared by the method of claim 12.
26. A coated airbag fabric prepared by the method of claim 13.

* * * * *